(12) United States Patent
Mizushima et al.

(10) Patent No.: US 7,795,327 B2
(45) Date of Patent: Sep. 14, 2010

(54) WATER-BASED INKS FOR INK-JET PRINTING

(75) Inventors: Ryuma Mizushima, Wakayama (JP); Isao Tsuru, Wakayama (JP); Hirotaka Takeno, Wakayama (JP)

(73) Assignee: KAO Corporation, Tokyo (JP)

( * ) Notice: Subject to any disclaimer, the term of this patent is extended or adjusted under 35 U.S.C. 154(b) by 593 days.

(21) Appl. No.: 11/211,718

(22) Filed: Aug. 26, 2005

(65) Prior Publication Data

US 2006/0052480 A1 Mar. 9, 2006

(30) Foreign Application Priority Data

Aug. 27, 2004 (JP) ............................. 2004-248478

(51) Int. Cl.
*C09D 11/00* (2006.01)
(52) U.S. Cl. ...................................... 523/160; 523/161
(58) Field of Classification Search ................. 523/160, 523/161
See application file for complete search history.

(56) References Cited

U.S. PATENT DOCUMENTS

| 5,736,606 | A | 4/1998 | Yanagi et al. | |
|---|---|---|---|---|
| 6,117,921 | A | 9/2000 | Ma et al. | |
| 6,406,143 | B1 | 6/2002 | Chen et al. | |
| 6,740,690 | B2 * | 5/2004 | Nakano et al. | 523/160 |
| 6,852,777 | B1 * | 2/2005 | Nakano et al. | 523/160 |
| 2006/0030640 | A1 | 2/2006 | Tsuru et al. | |

FOREIGN PATENT DOCUMENTS

| EP | 1323789 A1 * | 7/2003 |
|---|---|---|
| JP | 10-87768 | 3/1989 |
| JP | 2002-088285 | 3/2002 |
| JP | 2004-002662 | 1/2004 |
| JP | 2004-217916 | 8/2004 |
| WO | WO 00/39226 | 7/2000 |

OTHER PUBLICATIONS

Patent Abstracts of Japan, JP 10-060332, March 3, 1998.

* cited by examiner

*Primary Examiner*—Edward J Cain
(74) *Attorney, Agent, or Firm*—Oblon, Spivak, McClelland, Maier & Neustadt, L.L.P.

(57) ABSTRACT

A water dispersion containing colorant-containing water-insoluble vinyl polymer particles, and a water-based ink containing the water dispersion. The water-insoluble vinyl polymer contains constitutional units of formulae (1) and (2):

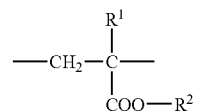

(1)

where $R^1$ is a hydrogen atom or a methyl group; and $R^2$ is a substituted or unsubstituted arylalkyl group or a substituted or unsubstituted aryl group; and

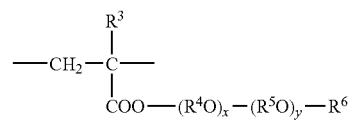
(2)

where $R^3$ is a hydrogen atom or a methyl group; $R^4O$ is an oxypropylene group; $R^5O$ is an oxyalkylene group having 2 or 4 carbon atoms; $R^6$ is a hydrogen atom, an alkyl group or an unsubstituted or alkyl-substituted phenyl group; x is a number from 1 to 30; and y is a number from 0 to 30, and a weight ratio of the constitutional units of formula (1) to formula (2) in the polymer ranges from 1/2 to 10/1.

15 Claims, No Drawings

WATER-BASED INKS FOR INK-JET PRINTING

FIELD OF THE INVENTION

The present invention relates to water dispersions for ink-jet printing, and water-based inks for ink-jet printing containing the water dispersions.

BACKGROUND OF INVENTION

In ink-jet printing methods, droplets of ink are directly projected onto a recording medium from very fine nozzles and allowed to adhere to the recording medium, to form characters and image. The ink-jet printing methods have been rapidly spread because of their various advantages such as easiness of full coloration, low costs, capability of using ordinary paper as the recording medium, non-contact with printed images and characters, etc.

Among such printing methods, in view of enhancing the weather resistance and water resistance of printed images and characters, an ink-jet printing method utilizing an ink containing a pigment as the colorant has now come to dominate (for example, refer to PCT pamphlet WO 00/39226, JP 10-87768A and JP 2004-2662A).

PCT pamphlet WO 00/39226 discloses a water-based ink containing a pigment-containing vinyl polymer in which a graft polymer obtained from a macromer is used as the vinyl polymer to achieve a high print density.

In JP 10-87768A, there is disclosed a water dispersion containing an insoluble colorant and a graft copolymer dispersant having a main chain and at least one side chain in which both the chains are respectively produced from an ethylenically unsaturated monomer, and one of the main chain and side chain constitutes a hydrophilic moiety and the other constitutes a hydrophobic moiety containing at least one monomer selected from the group consisting of aryl esters of acrylic acid, aryl esters of methacrylic acid, N-aryl acrylamides, N-aryl methacrylamides and vinyl aryl esters in an amount of at least 50% by weight based on the total weight of the hydrophobic moiety.

In JP 2004-2662A, there is disclosed the use of polypropylene glycol monomethacrylate for enhancing an ejection property and a dispersion stability of the ink.

Although these conventional water-based inks are excellent in print density and dispersion stability, there is such a demand that the water-based inks exhibit a still more excellent performance upon printing on any of ordinary papers and coated papers such as photographic papers and glossy papers.

SUMMARY OF THE INVENTION

The present invention relates to water dispersions containing colorant-containing water-insoluble vinyl polymer particles, and water-based inks containing the water dispersions. The water-insoluble vinyl polymer is a polymer containing constitutional units represented by the following general formulae (1) and (2):

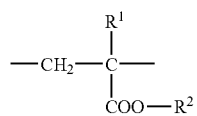
(1)

wherein $R^1$ is a hydrogen atom or a methyl group; and $R^2$ is a substituted or unsubstituted arylalkyl group or a substituted or unsubstituted aryl group; and

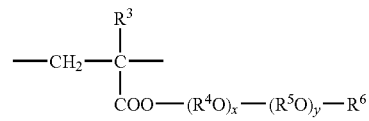
(2)

wherein $R^3$ is a hydrogen atom or a methyl group; $R^4O$ is an oxypropylene group; $R^5O$ is an oxyalkylene group having 2 or 4 carbon atoms; $R^6$ is a hydrogen atom, an alkyl group, a phenyl group which may be substituted with an alkyl group; x is a number from 1 to 30; and y is a number from 0 to 30, with the proviso that a weight ratio (1)/(2) of the constitutional unit represented by the general formula (1) to the constitutional unit represented by the general formula (2) in the polymer is in the range of from 1/2 to 10/1.

DETAILED DESCRIPTION OF THE INVENTION

The present invention relates to a water-based ink for ink-jet printing which is capable of highly achieving both an excellent gloss upon printing on a coated paper, and a high print density upon printing on an ordinary paper, as well as a water dispersion for ink-jet printing which is used for production of the water-based ink.

The water-based ink ejected from an ink-jet printer can produce prints with a high print density when a water dispersion of colorant-containing water-insoluble vinyl polymer particles which is contained in the ink exhibits a high cohesiveness on a printing paper. On the contrary, the water dispersion having a low cohesiveness tends to be readily penetrated into the printing paper, so that resultant prints show a high gloss. Thus, since the high print density and the high gloss are contradictory to each other, it may be difficult to simultaneously achieve both the properties at a higher level by one ink. In addition, even though the water-insoluble vinyl polymer obtained from a hydrophobic monomer such as styrene which is capable of enhancing the cohesiveness and a salt-forming group-containing monomer such as (meth) acrylic acid which is capable of lowering the cohesiveness is used in the water dispersion, the resultant ink also fails to achieve the aimed task of the present invention.

Namely, only when the water-insoluble vinyl polymer is a polymer containing constitutional units represented by the following general formulae (1) and (2) in which a weight ratio (1)/(2) of the constitutional unit represented by the general formula (1) to the constitutional unit represented by the general formula (2) is in the range of from 1/2 to 10/1, it is possible to highly achieve both an excellent gloss upon printing on a coated paper and a high print density upon printing on an ordinary paper.

Thus, the present invention relates to a water dispersion for ink-jet printing containing colorant-containing water-insoluble vinyl polymer particles in which the water-insoluble vinyl polymer is a polymer containing constitutional units represented by the following general formulae (1) and (2):

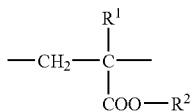

(1)

wherein $R^1$ is a hydrogen atom or a methyl group; and $R^2$ is a substituted or unsubstituted arylalkyl group having 7 to 22 carbon atoms or a substituted or unsubstituted aryl group having 6 to 22 carbon atoms, and

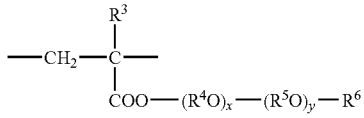

(2)

wherein $R^3$ is a hydrogen atom or a methyl group; $R^4O$ is an oxypropylene group; $R^5O$ is an oxyalkylene group having 2 or 4 carbon atoms; $R^6$ is a hydrogen atom, an alkyl group having 1 to 20 carbon atoms or a phenyl group which may be substituted with an alkyl group having 1 to 9 carbon atoms in which $R^4O$ and $R^5O$ are random-added or block-added, and when block-added, the structure may be in the form of either —COO—$(R^4O)_x$—$(R^5O)_y$—$R^6$ or —COO—$(R^5O)_y$—$(R^4O)_x$—$R^6$; and x and y represent average molar numbers of addition where x is a number from 1 to 30 and y is a number from 0 to 30, and if y is 2 or more, a plurality of the $R^5O$ groups may be the same or different, with the proviso that a weight ratio (1)/(2) of the constitutional unit represented by the general formula (1) to the constitutional unit represented by the general formula (2) in the polymer is in the range of from 1/2 to 10/1, as well as a water-based ink containing the water dispersion.

Water-Insoluble Vinyl Polymer

The water-insoluble vinyl polymer used in the present invention contains the constitutional unit represented by the following formula (1):

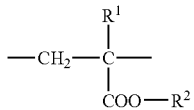

(1)

In the general formula (1), $R^1$ is a hydrogen atom or a methyl group, and $R^2$ is a substituted or unsubstituted arylalkyl group having 7 to 22 carbon atoms, preferably 7 to 18 carbon atoms and more preferably 7 to 12 carbon atoms, or a substituted or unsubstituted aryl group having 6 to 22 carbon atoms, preferably 6 to 18 carbon atoms and more preferably 6 to 12 carbon atoms. The substituent group which may be bonded to $R^2$ may contain a hetero atom. Examples of the hetero atom include a nitrogen atom, an oxygen atom and a sulfur atom.

Specific examples of $R^2$ include a benzyl group, a phenethyl (phenylethyl) group, a phenoxyethyl group, a diphenylmethyl group and a trityl group.

Specific examples of the substituent group which may be bonded to R2 include an alkyl, alkoxy or acyloxy group, preferably having 1 to 9 carbon atoms, a hydroxyl group, an ether group, an ester group and a nitro group.

The constitutional unit represented by the general formula (1) is particularly preferably those constitutional units derived from benzyl (meth)acrylate in view of a high gloss of the resultant prints.

The constitutional unit represented by the formula (1) is preferably produced by polymerizing a monomer represented by the following formula (1-1):

$$CH_2{=}CR^1COOR^2 \qquad (1\text{-}1)$$

wherein $R^1$ and $R^2$ are the same as defined above.

More specifically, a polymer containing the constitutional unit represented by the formula (1) may be produced by polymerizing a monomer such as phenyl(meth)acrylate, benzyl(meth)acrylate, 2-phenylethyl(meth)acrylate, phenoxyethyl(meth)acrylate, 1-naphthalyl acrylate, 2-naphthalyl (meth)acrylate, phthalimidemethyl(meth)acrylate, p-nitrophenyl(meth)acrylate, 2-hydroxy-3-phenoxypropyl (meth)acrylate, 2-methacryloyloxyethyl-2-hydroxypropyl phthalate and 2-acryloyloxyethyl phthalic acid. Among these monomers, especially preferred is benzyl(meth)acrylate. These monomers may be used alone or in the form of a mixture of any two or more thereof.

Meanwhile, the term "(meth)acrylate" used herein means an "acrylate", a "methacrylate" or a mixture thereof.

The water-insoluble vinyl polymer used in the present invention further contains the constitutional unit represented by the following formula (2):

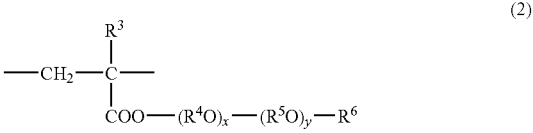

(2)

In the above general formula (2), $R^3$ represents a hydrogen atom or a methyl group, and $R^4O$ is an oxypropylene group. $R^4O$ may include —CH($CH_3$)$CH_2$O— in addition to —$CH_2$CH($CH_3$)O—. $R^5O$ represents an oxyalkylene group having 2 or 4 carbon atoms. Among these oxyalkylene groups, preferred is an oxyethylene group or an oxytetramethylene (oxybutylene) group.

$R^6$ represents a hydrogen atom, an alkyl group having 1 to 20 carbon atoms or a phenyl group which may be substituted with an alkyl group having 1 to 9 carbon atoms. From the standpoints of a high print density and a good storage stability of the resultant ink, among these groups, preferred are alkyl groups having 1 to 12 carbon atoms, and more preferred are alkyl groups having 1 to 8 carbon atoms, and also preferred are phenyl groups which may be substituted with an alkyl group having 1 to 8. Examples of the alkyl group having 1 to 8 carbon atoms include methyl, ethyl, propyl, isopropyl, butyl, t-butyl, hexyl, octyl and 2-ethylhexyl.

The suffixes x and y represent average molar numbers of addition where x is a number from 1 to 30, preferably from 2 to 30, more preferably from 3 to 20 and still more preferably from 3 to 15, and y is a number from 0 to 30, preferably from 0 to 20 and more preferably from 0 to 15. If y is 2 or more, a plurality of the $R^5O$ groups may be the same or different.

A bonding type of $R^4O$ and $R^5O$ is not particularly limited, and $R^4O$ and $R^5O$ are random-added or block-added. When $R^4O$ and $R^5O$ are block-added, the structure may be in the form of either —COO—$(R^4O)_x$—$(R^5O)_y$—$R^6$ or —COO—$(R^5O)_y$—$(R^4O)_x$—$R^6$. For example, the block addition structure may be either —COO—$(R^4O)_{x1}$—$(R^5O)_y$—$(R^4O)_{x2}$—$R^6$ (where x1+x2=X) in which the $R^5O$ groups which are Y in number are sandwiched between the $R^4O$ groups which are X in number, or —COO—$(R^5O)_{y1}$—$(R^4O)_x$—$(R^5O)_{y2}$—$R^6$ (where y1+y2=Y) in which the $R^4O$ groups which are X in number are sandwiched between the $R^5O$ groups which are Y in number.

In the case where the $R^5O$ groups which are Y in number are different from each other, the bonding type of these $R^5O$ groups may be any of random addition, block addition, etc. For example, in the case where the oxyethylene groups (hereinafter referred to merely as EO) and the oxytetramethylene groups (hereinafter referred to merely as TO) are block-added, the block addition structure may be either —COO—$(R^4O)_x$-$(EO)_{y1}$-$(TO)_{y2}$—$R^6$, or —COO-$(EO)_{y1}$-$(TO)_{y2}$—$(R^4O)_x$—$R^6$ (where y1+y2=Y).

The constitutional unit represented by the general formula (2) is preferably produced by polymerizing a monomer represented by the following general formula (2-1):

$$CH_2=CR^3COO—(R^4O)_x—(R^5O)_y—R^6 \quad (2\text{-}1)$$

wherein $R^3$, $R^4O$, $R^5O$, $R^6$, x and y are the same as defined above.

Among those constitutional units represented by above general formula (2), the constitutional units represented by the following general formula (3) or (4) are preferred in view of a high print density of the resultant ink. Further, the water-insoluble polymer used in the present invention may contain both constitutional units represented by the following general formulae (3) and (4).

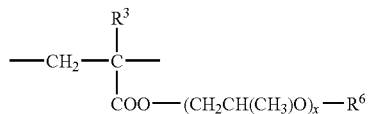
(3)

wherein $R^3$, x and $R^6$ are the same as defined above.

The constitutional unit represented by the general formula (3) corresponds to the constitutional unit represented by the general formula (2) in which y is 0.

The constitutional unit represented by the general formula (3) is preferably produced by polymerizing a monomer represented by the following general formula (3-1):

$$CH_2=CR^3COO—(CH_2CH(CH_3)O)_x—R^6 \quad (3\text{-}1)$$

wherein $R^3$, $R^6$ and x are the same as defined above.

Specific examples of the monomer represented by the general formula (3-1) include polypropylene glycol mono(meth)acrylate, methoxy polypropylene glycol mono(meth)acrylate, ethoxy polypropylene glycol mono(meth)acrylate, octoxy polypropylene glycol mono(meth)acrylate, stearoxy polypropylene glycol mono(meth)acrylate, nonylphenoxy polypropylene glycol mono(meth)acrylate and phenoxy polypropylene glycol mono(meth)acrylate. Among these monomers, especially preferred is polypropylene glycol mono(meth)acrylate. These monomers may be used alone or in the form of a mixture of any two or more thereof.

The constitutional unit represented by the following general formula (4) corresponds to the constitutional unit represented by the general formula (2) in which y is 1 or more.

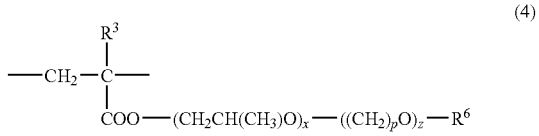
(4)

wherein $R^3$, x, and $R^6$ are the same as defined above; p is a number of 2 or 4; z represents an average molar number of addition, and is a number from 1 to 30, preferably from 2 to 20 and more preferably from 3 to 15; and $(CH_2CH(CH_3)O)$ and $((CH_2)_pO)$ are random-added or block-added, and when being block-added, the structure may be in the form of either —COO—$(CH_2CH(CH_3)O)_x$—$((CH_2)_pO)_z$—$R^6$ or —COO—$((CH_2)_pO)_z$—$(CH_2CH(CH_3)O)_x$—$R^6$.

The constitutional unit represented by the general formula (4) is preferably produced by polymerizing a monomer represented by the following general formula (4-1) or (4-2):

$$CH_2=CR^3COO—(CH_2CH(CH_3)O)_x—(CH_2CH_2O)_z—R^6 \quad (4\text{-}1); \text{ or}$$

$$CH_2=CR^3COO—(CH_2CH(CH_3)O)_x—((CH_2)_4O)_z—R^6 \quad (4\text{-}2),$$

wherein $R^3$, $R^6$, x and z are the same as defined above; $(CH_2CH(CH_3)O)$ and $(CH_2CH_2O)$ as well as $(CH_2CH(CH_3)O)$ and $((CH_2)_4O)$ are random-added or block-added, and when being block-added, the structures may be in the form of either $CH_2=CR^3COO—(CH_2CH(CH_3)O)_x—(CH_2CH_2O)_z—R^6$ or $CH_2=CR^3COO—(CH_2CH_2O)_x—(CH_2CH(CH_3)O)_z—R^6$, and either $CH_2=CR^3COO—(CH_2CH(CH_3)O)_z—((CH_2)_4O)_z—R^6$ or $CH_2=CR^3COO—((CH_2)_4O)_z—(CH_2CH(CH_3)O)_x—R^6$, respectively.

Specific examples of the monomers represented by the general formulae (4-1) and (4-2) include ethylene glycol/propylene glycol mono(meth)acrylate, poly(ethylene glycol/propylene glycol) mono(meth)acrylate [in which ethylene glycol and propylene glycol are randomly bonded], octoxy polyethylene glycol/polypropylene glycol mono(meth)acrylate [in which polyethylene glycol and polypropylene glycol are block-bonded, and the polyethylene glycol and polypropylene glycol may be successively block-bonded from the side of the (meth)acrylic group or vice versa; this definition is similarly applied to the below-mentioned compounds], octoxy poly(ethylene glycol/propylene glycol) mono(meth)acrylate, stearoxy polyethylene glycol/polypropylene glycol mono(meth)acrylate, stearoxy poly(ethylene glycol/propylene glycol) mono(meth)acrylate, phenoxy polyethylene glycol/polypropylene glycol mono(meth)acrylate, phenoxy poly(ethylene glycol/propylene glycol) mono(meth)acrylate, nonylphenoxy polyethylene glycol/polypropylene glycol mono(meth)acrylate, nonylphenoxy poly(ethylene glycol/propylene glycol) mono(meth)acrylate, and poly(propylene glycol/tetramethylene glycol) mono(meth)acrylate. Among these monomers, especially preferred are poly(ethylene glycol/propylene glycol) mono(meth)acrylate and poly(propylene glycol/tetramethylene glycol) mono(meth)acrylate. These monomers may be used alone or in the form of a mixture of any two or more thereof.

Specific examples of commercially available products of the monomer represented by the general formula (2-1) include BLEMMER Series PP-500, PP-800, PP-1000, AP-150, AP-400, AP-550, AP-800, 50PEP-300, 50PPT-800 and 50POEP-800 all available from NOF Corporation.

In the water-insoluble vinyl polymer used in the present invention, the weight ratio (1)/(2) of the constitutional unit represented by the general formula (1) to the constitutional unit represented by the general formula (2) in the polymer is in the range of from 1/2 to 10/1, preferably from 1/2 to 8/1, more preferably from 1/2 to 5/1 and most preferably from 1/1 to 5/1 in view of achieving both a high print density and a good gloss as well as a high scratch resistance of the resultant prints. When the weight ratio of the constitutional unit represented by the general formula (1) to the constitutional unit represented by the general formula (2) in the water-insoluble vinyl polymer lies within the above-specified range, the resultant prints can highly achieve both a high gloss upon printing on coated papers and a good print density upon printing on ordinary papers which have never been attained by using the conventional polymers containing only one of the constitutional units.

The water-insoluble vinyl polymer used in the present invention preferably further contains a constitutional unit derived from a salt-forming group-containing monomer (a) in view of enhancing a dispersion stability of the polymer. The constitutional unit derived from the salt-forming group-containing monomer (a) can be produced by polymerizing a salt-forming group-containing monomer. Alternatively, after completion of the polymerization, salt-forming groups such as anionic groups and cationic groups may be introduced into the resultant polymer chain. Examples of the salt-forming group include anionic groups such as a carboxyl group, a sulfonic group and a phosphoric group, and cationic groups such as an amino group and an ammonium group.

Examples of the preferred salt-forming group-containing monomer include anionic monomers (a-1) and cationic monomers (a-2).

As the anionic monomer (a-1), there may be used at least one compound selected from the group consisting of unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethylsuccinic acid.

Examples of the unsaturated sulfonic acid monomers include styrenesulfonic acid, 2-acrylamido-2-methylpropanesulfonic acid, 3-sulfopropyl(meth)acrylic ester and bis(3-sulfopropyl)itaconic ester.

Examples of the unsaturated phosphoric acid monomers include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate.

Among the above anionic monomers, preferred are the unsaturated carboxylic acid monomers in view of a suitable viscosity and a good ejecting property of the resultant ink, and more preferred are acrylic acid and methacrylic acid.

As the cationic monomer (a-2), there may be used at least one compound selected from the group consisting of unsaturated tertiary amine-containing vinyl monomers and unsaturated ammonium salt-containing vinyl monomers.

Examples of the unsaturated tertiary amine-containing vinyl monomers include N,N-dimethylaminoethyl(meth)acrylate, N,N-dimethylaminopropyl(meth)acrylate, N,N-diethylaminoethyl(meth)acrylate, N,N-dimethylaminopropyl (meth)acrylamide, vinyl pyrrolidone, 2-vinyl pyridine, 4-vinyl pyridine, 2-methyl-6-vinyl pyridine and 5-ethyl-2-vinyl pyridine.

Examples of the unsaturated ammonium salt-containing vinyl monomers include quaternary ammonium compounds derived from N,N-dimethylaminoethyl(meth)acrylate, quaternary ammonium compounds derived from N,N-diethylaminoethyl(meth)acrylate, and quaternary ammonium compounds derived from N,N-dimethylaminopropyl (meth)acrylate.

Among the above cationic monomers, preferred are N,N-dimethylaminoethyl(meth)acrylate, N,N-dimethylaminopropyl (meth)acrylamide and vinyl pyrrolidone.

These salt-forming group-containing monomers (a) may be used alone or in the form of a mixture of any two or more thereof.

The water-insoluble vinyl polymer used in the present invention preferably further contains the constitutional units derived from a styrene-based macromer (b) and/or a hydrophobic monomer (c) in view of enhancing a dispersion stability, a print density and a resistance to markers of the resultant ink.

Examples of the styrene-based macromer (b) include styrene homopolymers having a polymerizable functional group at one terminal end thereof, and copolymers of styrene with the other monomer which have a polymerizable functional group at one terminal end thereof The polymerizable functional group bonded to the one terminal end is preferably an acryloyloxy group or a methacryloyloxy group. When these functional groups are copolymerized to the end of the polymer or copolymer, it is possible to produce the water-insoluble vinyl polymer containing a constitutional unit derived from the styrene-based macromer (b).

Examples of the other monomer copolymerizable with styrene include (1) acrylonitrile, (2) (meth)acrylic esters with an alkyl group having 1 to 22 carbon atoms and preferably 1 to 18 carbon atoms which may have a hydroxyl group, and (3) aromatic ring-containing monomers other than styrene.

Specific examples of the (meth)acrylic esters (2) include methyl (meth)acrylate, ethyl(meth)acrylate, (iso)propyl (meth)acrylate, 2-hydroxyethyl(meth)acrylate, (iso- or tertiary-)butyl(meth)acrylate, 2-ethylhexyl(meth)acrylate, (iso) octyl(meth)acrylate, (iso)decyl (meth)acrylate and (iso) stearyl(meth)acrylate.

Meanwhile, the terms "(iso- or tertiary-)" and "(iso)" used herein mean both branched structures represented by "iso" and "tertiary", and unbranched structure (i.e., "normal").

Examples of the aromatic ring-containing monomers (3) include vinyl monomers containing an aromatic ring having 6 to 22 carbon atoms such as a-methyl styrene, vinyl toluene, vinyl naphthalene, ethylvinyl benzene, 4-vinyl biphenyl, 1,1-diphenyl ethylene, benzyl(meth)acrylate, phenoxyethyl (meth)acrylate, 2-hydroxy-3-phenoxypropyl acrylate and 2-methacryloyloxyethyl-2-hydroxypropyl phthalate.

These monomers may be used alone or in the form of a mixture of any two or more thereof.

The content of the constitutional unit derived from styrene in the styrene-based macromer (b) is preferably 60% by weight or higher, more preferably 70% by weight or higher and still more preferably 90% by weight or higher in view of incorporating a sufficient amount of the colorant into the water-insoluble vinyl polymer particles and enhancing the print density.

The number-average molecular weight of the styrene-based macromer (b) is preferably in the range of from 1,000 to 10,000 and more preferably 2,000 to 8,000 in view of controlling a viscosity of the water-insoluble vinyl polymer to a low level while increasing a copolymerization ratio thereof to enhance a storage stability of the resultant ink.

The number-average molecular weight of the styrene-based macromer is a value measured by gel permeation chromatography using polystyrene as a standard substance and using tetrahydrofuran containing 50 mmol/L of acetic acid as a solvent.

The styrene-based macromer is commercially available, for example, from Toagosei Co., Ltd., as product names of AS-6(S), AN-6(S), HS-6(S), etc.

The constitutional unit derived from the hydrophobic monomer (c) can be produced by polymerizing a hydrophobic monomer. Alternatively, after completion of the polymerization, the hydrophobic monomer may be introduced into the resultant polymer chain.

The hydrophobic monomer (c) is preferably (c-1) a (meth)acrylate containing an alkyl group having 1 to 22 carbon atoms, or (c-2) a monomer represented by the following general formula (5):

$$CH_2=C(R^3)-R^4 \quad (5)$$

wherein $R^3$ is a hydrogen atom or an alkyl group having 1 to 5 carbon atoms; and $R^4$ is an aromatic ring-containing hydrocarbon group having 6 to 22 carbon atoms.

Examples of the (meth)acrylate (c-1) containing an alkyl group having 1 to 22 carbon atoms include methyl(meth)acrylate, ethyl(meth)acrylate, (iso)propyl(meth)acrylate, (iso- or tertiary-)butyl(meth)acrylate, 2-ethylhexyl(meth)acrylate, (iso)octyl(meth)acrylate, (iso)decyl(meth)acrylate, (iso)dodecyl(meth)acrylate, (iso)stearyl(meth)acrylate and behenyl(meth)acrylate.

As the monomer (c-2) represented by the above general formula (5), in view of the print density, there is preferably used at least one monomer selected from the group consisting of styrene, vinyl naphthalene, α-methyl styrene, vinyl toluene, ethylvinyl benzene, 4-vinyl biphenyl and 1,1-diphenyl ethylene. Among these monomers, at least one styrene-based monomer selected from the group consisting of styrene, α-methyl styrene and vinyl toluene is preferred in view of a good print density and storage stability of the resultant ink.

The water-insoluble vinyl polymer used in the present invention may further contain other constitutional units. Examples of the other constitutional units include constitutional units derived from silicone-based macromers having a polymerizable functional group at one terminal end thereof which are preferably represented by the following formula (6):

$$CH_2=C(CH_3)-COOC_3H_6-[Si(CH_3)_2-O]_t-Si(CH_3)_3 \quad (6)$$

wherein t is a number from 8 to 40, as well as constitutional units derived from alkyl(meth)acrylate-based macromers having a polymerizable functional group at one terminal end thereof, such as methyl methacrylate-based macromers, butyl acrylate-based macromers and isobutyl methacrylate-based macromers.

The water-insoluble vinyl polymer used in the present invention is preferably produced by copolymerizing a monomer mixture containing the monomer represented by the above formula (1-1) and the monomer represented by the above formula (2-1), and further optionally the salt-forming group-containing monomer (a), the styrene-based macromer (b) and/or the hydrophobic monomer (c) (hereinafter referred to merely as a "monomer mixture").

The content of the monomer represented by the formula (1-1) in the monomer mixture or the content of the constitutional unit represented by the general formula (1) in the water-insoluble vinyl polymer is preferably 20 to 80% by weight, more preferably 25 to 80% by weight and still more preferably 25 to 75% by weight in view of enhancing a print density and a gloss of the resultant water-based ink as well as good scratch resistance and dispersion stability thereof.

The content of the monomer represented by the general formula (2-1) in the monomer mixture or the content of the constitutional unit represented by the general formula (2) in the water-insoluble vinyl polymer is preferably 5 to 60% by weight, more preferably 8 to 55% by weight and still more preferably 10 to 50% by weight in view of enhancing a print density and a gloss of the resultant water-based ink as well as good scratch resistance and dispersion stability thereof.

The content of the salt-forming group-containing monomer (a) in the monomer mixture (a content as a non-neutralized amount; hereinafter, it shall be calculated as a non-neutralized amount of a salt-forming group-containing monomer) or the content of the constitutional unit derived from the salt-forming group-containing monomer (a) in the water-insoluble vinyl polymer is preferably 3 to 30% by weight, more preferably 5 to 25% by weight and still more preferably 5 to 20% by weight in view of enhancing a print density and a gloss of the resultant water-based ink as well as a good dispersion stability thereof.

The weight ratio (1)/(a) of the constitutional unit represented by the general formula (1) to the constitutional unit derived from the salt-forming group-containing monomer (a) is preferably from 10/1 to 1/1, more preferably from 8/1 to 2/1 and still more preferably from 7/1 to 3/1 in view of enhancing a dispersion stability of the water-insoluble vinyl polymer and a gloss of the resultant water-based ink.

The weight ratio (2)/(a) of the constitutional unit represented by the general formula (2) to the constitutional unit derived from the salt-forming group-containing monomer (a) is preferably 10/1 to 1/1, more preferably 7/1 to 1/1 and still more preferably 5/1 to 1/1 in view of enhancing a dispersion stability of the water-insoluble vinyl polymer and a print density of the resultant water-based ink.

The content of the styrene-based macromer (b) in the monomer mixture or the content of the constitutional unit derived from the styrene-based macromer (b) in the water-insoluble vinyl polymer is preferably 0 to 40% by weight, more preferably 5 to 35% by weight and still more preferably 5 to 30% by weight in view of a good print density of the resultant water-based ink.

The content of the hydrophobic monomer (c) in the monomer mixture, or the content of the constitutional unit derived from the hydrophobic monomer (c) in the water-insoluble vinyl polymer is preferably 0 to 40% by weight and more preferably 0 to 20% by weight in view of a good print density and a good dispersion stability of the resultant water-based ink.

The term "water-insoluble" used herein for the water-insoluble vinyl polymer means that the water-insoluble vinyl polymer is dissolved at 25° C. in 100 g of water in an amount of preferably 10 g or less, more preferably 5 g or less and still more preferably 1 g or less in view of reduction in viscosity of the resultant water-based ink. When the water-insoluble vinyl polymer contains a salt-forming group, the above amount of the water-insoluble vinyl polymer dissolved in water is measured after the salt-forming group is neutralized 100% with sodium hydroxide or acetic acid according to the kind of salt-forming group.

In the present invention, the water-insoluble vinyl polymer containing a salt-forming group is used therein after neutralizing the salt-forming group derived from the salt-forming group-containing monomer with the below-mentioned neutralizing agent. The degree of neutralization of the salt-forming group is preferably 10 to 200%, more preferably 20 to 150% and still more preferably 50 to 150%.

When the salt-forming group is an anionic group, the degree of neutralization is calculated according to the following formula:

{[weight (g) of neutralizing agent/equivalent of neutralizing agent]/[acid value of polymer (KOH mg/g)×weight (g) of polymer/(56×1,000)]}×100

When the salt-forming group is a cationic group, the degree of neutralization is calculated according to the following formula:

{[weight (g) of neutralizing agent/equivalent of neutralizing agent]/[amine value of polymer (HCl mg/g)×weight (g) of polymer/(36.5×1,000)]}×100

The acid value or amine value may be calculated from the respective constitutional units of the water-insoluble vinyl polymer, or may also be determined by the method of subjecting a solution prepared by dissolving the polymer in an appropriate solvent such as methyl ethyl ketone to titration.

The weight-average molecular weight of the water-insoluble vinyl polymer used in the present invention is preferably 5,000 to 500,000, more preferably 10,000 to 400,000 and still more preferably 10,000 to 300,000 in view of a good dispersion stability of the colorant as well as a good water resistance and a good ejection property of the resultant ink.

Meanwhile, the weight-average molecular weight of the water-insoluble vinyl polymer may be measured by gel permeation chromatography using dimethylformamide containing 60 mmol/L of phosphoric acid and 50 mmol/L of lithium bromide as a solvent and using polystyrene as a standard substance.

Process for Production of Water-Insoluble Vinyl Polymer

The water-insoluble vinyl polymer used in the present invention may be produced by copolymerizing the monomer mixture by known polymerization methods such as bulk polymerization, solution polymerization, suspension polymerization and emulsion polymerization. Among these polymerization methods, preferred is the solution polymerization.

The solvent used in the solution polymerization method is preferably an organic polar solvent, although not limited thereto. The organic polar solvent miscible with water may be used in the form of a mixture with water. Examples of the organic polar solvent include aliphatic alcohols having from 1 to 3 carbon atoms such as methanol, ethanol and propanol; ketones such as acetone and methyl ethyl ketone; and esters such as ethyl acetate. Among these solvents, preferred are methanol, ethanol, acetone, methyl ethyl ketone and mixed solvents of at least one of these solvents with water.

The polymerization may be carried out in the presence of a radical polymerization initiator. Preferred radical polymerization initiators are azo compounds such as 2,2'-azobisisobutyronitrile, 2,2'-azobis(2,4-dimethylvaleronitrile), dimethyl-2,2'-azobisbutyrate, 2,2'-azobis(2-methylbutyronitrile), and 1,1'-azobis(1-cyclohexanecarbonitrile). Alternatively, organic peroxides such as t-butyl peroxyoctoate, di-t-butyl peroxide and dibenzoyl oxide may also be used.

The amount of the radical polymerization initiator to be used is preferably from 0.001 to 5 mol and more preferably from 0.01 to 2 mol per 1 mol of the monomer mixture.

The polymerization may also be carried out in the presence of a chain transfer agent. Specific examples of the chain transfer agent include mercaptans such as octyl mercaptan, n-dodecyl mercaptan, t-dodecyl mercaptan, n-tetradecyl mercaptan, mercaptoethanol, 3-mercapto-1,2-propanediol and mercaptosuccinic acid; thiuram disulfides; hydrocarbons; unsaturated cyclic hydrocarbon compounds; and unsaturated heterocyclic compounds. These chain transfer agents may be used alone or in the form of a mixture of any two or more thereof.

The polymerization conditions of the monomer mixture vary depending upon the kinds of radical polymerization initiator, monomers, solvent, etc., to be used, and the polymerization is generally conducted at a temperature of preferably 30 to 100° C. and more preferably 50 to 80° C. for 1 to 20 h. The polymerization is preferably conducted in an atmosphere of an inert gas such as nitrogen and argon.

After completion of the polymerization, the water-insoluble vinyl polymer thus produced is isolated from the reaction product solution by a known method such as reprecipitation and removal of solvent by distillation. The thus obtained water-insoluble vinyl polymer may be purified by repeated reprecipitation, membrane separation, chromatography, extraction, etc., for removing unreacted monomers, etc., therefrom.

Colorant

The colorant used in the present invention is preferably pigment or hydrophobic dye in view of a good water resistance thereof. Among these colorants, to meet the recent strong demand for a high weather resistance, preferred is the pigment.

The pigment or hydrophobic dye used in the water-based ink is required to be present in the form of stable fine particles using a surfactant or a water-insoluble polymer. In particular, in view of anti-bleeding property and water resistance, the pigment or hydrophobic dye is preferably included in particles of the water-insoluble polymer.

The pigment may be either organic or inorganic. The organic or inorganic pigment may be used in combination with an extender pigment, if required.

Examples of the inorganic pigments include carbon blacks, metal oxides, metal sulfides and metal chlorides. Among these inorganic pigments, carbon blacks are preferably used for black water-based inks. The carbon blacks may include furnace blacks, thermal lamp blacks, acetylene blacks and channel blacks.

Examples of the organic pigments include azo pigments, disazo pigments, phthalocyanine pigments, quinacridone pigments, isoindolinone pigments, dioxazine pigments, perylene pigments, perinone pigments, thioindigo pigments, anthraquinone pigments and quinophthalone pigments.

Specific examples of the preferred organic pigments include commercially available products marketed under the tradenames C.I. Pigment Yellow, C.I. Pigment Red, C.I. Pigment Violet, C.I. Pigment Blue, C.I. Pigment Green, etc., with various product numbers.

Examples of the extender pigment include silica, calcium carbonate and talc.

The hydrophobic dyes are not particularly limited as long as they can be incorporated in particles of the water-insoluble polymer. To allow the dye to efficiently become included in the water-insoluble polymer, the solubility of the hydrophobic dye is preferably 2 g/L or higher and more preferably from 20 to 500 g/L as measured at 25° C. based on the organic solvent used upon the production of the water-insoluble polymer.

Examples of the hydrophobic dyes include oil-soluble dyes and disperse dyes. Among these dyes, preferred are oil-soluble dyes.

Examples of the oil-soluble dyes include commercially available products marketed from Orient Chemical Co., Ltd., BASF AG, etc., under the tradenames C.I. Solvent Black, C.I. Solvent Yellow, C.I. Solvent Red, C.I. Solvent Violet, C.I.

Solvent Blue, C.I. Solvent Green, and C.I. Solvent Orange, etc., with various product numbers.

Examples of the preferred disperse dyes include commercially available products marketed under the tradenames C.I. Disperse Yellow, C.I. Disperse Orange, C.I. Disperse Red, C.I. Disperse Violet, C.I. Disperse Blue, C.I. Disperse Green, etc., with various product numbers. Among these dyes, preferred are C.I. Solvent Yellow 29 and 30 for yellow colorant, C.I. Solvent Blue 70 for cyan colorant, C.I. Solvent Red 18 and 49 for magenta colorant, and C.I. Solvent Black 3 and 7 and nigrosine black dyes for black colorant.

The above colorants may be used alone or in the form of a mixture containing any two or more thereof at an optional mixing ratio.

To enhance the dispersion stability and print density, the content of the colorant in the water dispersion and water-based ink of the present invention is preferably from 1 to 30% by weight, more preferably from 2 to 20% by weight and still more preferably from 2 to 10% by weight.

To enhance the print density, the colorant is preferably used in an amount of 20 to 1,000 parts by weight, more preferably 50 to 900 parts by weight and still more preferably 100 to 800 parts by weight based on 100 parts by weight of the solid content of the water-insoluble vinyl polymer.

Process for Production of Water Dispersion and Water-Based Ink

The water dispersion of the present invention is preferably produced through the following steps (1) and (2):

Step (1): Dispersing a mixture containing the water-insoluble vinyl polymer, organic solvent, neutralizing agent (in the case where the polymer contains the salt-forming group), colorant and water.

Step (2): Removing the organic solvent from the resultant dispersion.

In the step (1), first, the water-insoluble vinyl polymer is dissolved in an organic solvent, and then the colorant, neutralizing agent and water together with optional components such as surfactant, are added to the solution of the water-insoluble vinyl polymer in the organic solvent under mixing to obtain a dispersion of an oil-in-water type. The content of the colorant in the dispersion is preferably from 5 to 50% by weight. The content of the organic solvent in the dispersion is preferably from 10 to 70% by weight. The content of the water-insoluble vinyl polymer in the dispersion is preferably from 2 to 40% by weight, and the content of water in the dispersion is preferably from 10 to 70% by weight. The degree of neutralization of the polymer is not particularly limited. In general, the degree of neutralization is preferably controlled such that the finally obtained water dispersion exhibits a neutral liquid property, for example, a pH of 4.5 to 10. The pH of the dispersion may also be determined from a desired degree of neutralization for the water-insoluble vinyl polymer.

Examples of the preferred organic solvents include alcohol solvents, ketone solvents and ether solvents, i.e., the organic solvents are preferably those having a solubility in water of 50% by weight or lower but 10% by weight or higher as measured at 20° C.

Examples of the alcohol solvents include ethanol, isopropanol, n-butanol, tertiary butanol, isobutanol and diacetone alcohol. Examples of the ketone solvents include acetone, methyl ethyl ketone, diethyl ketone and methyl isobutyl ketone. Examples of the ether solvents include dibutyl ether, tetrahydrofuran and dioxane. Among these solvents, preferred are isopropanol, acetone and methyl ethyl ketone, and more preferred is methyl ethyl ketone.

As the neutralizing agent, acids or bases may be selectively used according to the kind of salt-forming group contained in the water-insoluble vinyl polymer.

Specific examples of the neutralizing agent include acids such as hydrochloric acid, acetic acid, propionic acid, phosphoric acid, sulfuric acid, lactic acid, succinic acid, glycolic acid, gluconic acid and glyceric acid, and bases such as lithium hydroxide, sodium hydroxide, potassium hydroxide, ammonia, methylamine, dimethylamine, trimethylamine, ethylamine, diethylamine, triethylamine and triethanolamine.

The method for dispersing the mixture used in the step (1) is not particularly limited. The water-insoluble polymer may be finely divided into polymer particles having a desired average particle size only by substantial dispersion procedure. Preferably, the mixture is first subjected to preliminary dispersion procedure, and then to the substantial dispersion procedure by applying a shear stress thereto so as to control the average particle size of the water-insoluble polymer particles to a desired size.

Upon subjecting the mixture to the preliminary dispersion procedure, there may be used ordinary mixing or stirring devices such as anchor blades. Examples of the preferred mixing or stirring devices include high-speed mixers or stirrers such as "Ultra Disper" (tradename: available from Asada Tekko Co., Ltd., "Ebara Milder" (tradename: available from Ebara Seisakusho Co., Ltd.), "TK Homomixer", "TK Pipeline Mixer", "TK Homo Jetter", "TK Homomic Line Flow" and "Filmix" (tradenames: all available from Tokushu Kika Kogyo Co., Ltd.), "Clearmix" (tradename: available from M-Technic Co., Ltd.) and "K.D. Mill" (tradename: available from Kinetics Dispersion Inc.).

To apply the shear stress to the mixture in the substantial dispersion procedure, there may be used, for example, kneading machines such as roll mills, beads mills, kneaders and extruders, homo-valve-type high-pressure homogenizers such as typically "High-Pressure Homogenizer" (tradename: available from Izumi Food Machinery Co., Ltd.) and "Mini-Labo 8.3H Model" (tradename: available from Rannie Corp.), and chamber-type high-pressure homogenizers such as "Micro Fluidizer" (tradename: available from Microfluidics Inc.), "Nanomizer" (tradename: available from Nanomizer Co., Ltd.), "Altimizer" (tradename: available from Sugino Machine Co., Ltd.), "Genus PY" (tradename: available from Hakusui Kagaku Co., Ltd.) and "DeBEE 2000" (tradename: Nippon BEE Co., Ltd.). Among these apparatuses, the high-pressure homogenizers are preferred in view of reducing a particle size of the pigment contained in the mixture.

In the step (2), the organic solvent is removed from the dispersion thus obtained in the above step (1) to render the dispersion water-based and thereby obtain a water dispersion of the water-insoluble polymer particles containing the colorant. The removal of the organic solvent from the dispersion may be performed by an ordinary method such as distillation under reduced pressure. The organic solvent is substantially completely removed from the thus obtained water dispersion of the water-insoluble polymer particles. The content of the residual organic solvent in the water dispersion is 0.1% by weight or lower and preferably 0.01% by weight or lower.

In the above water dispersion, solid components made of the water-insoluble polymer particles containing the colorant are dispersed in water as a main solvent. The configuration of the water-insoluble polymer particles containing the colorant is not particularly limited as long as the particles are formed from at least the colorant and the water-insoluble polymer. Examples of the configuration of the particles include the particle configuration in which the colorant is enclosed in the respective water-insoluble polymer particles, the particle configuration in which the colorant is uniformly dispersed in the respective water-insoluble polymer particles, and the particle configuration in which the colorant is exposed onto a surface of the respective water-insoluble polymer particles.

The water dispersion of the water-insoluble vinyl polymer particles may be directly used as a water-based ink using water as a main solvent, and may further contain various additives ordinarily used in water-based inks for ink-jet printing such as wetting agents, penetrants, dispersants, viscosity modifiers, defoaming agents, mildew-proof agents and anti-corrosion agents.

The average particle size of the water-insoluble vinyl polymer particles containing the colorant which are dispersed in the water dispersion and the water-based ink is preferably from 0.01 to 0.5 μm, more preferably from 0.03 to 0.3 μm and still more preferably from 0.05 to 0.2 μm in view of preventing clogging in a printer and enhancing the dispersion stability. The average particle size may be measured using a laser particle analyzing system "ELS-8000" (cumulant analysis) available from Otsuka Denshi Co., Ltd. The measurement is conducted at a temperature of 20° C., an angle between incident light and detector of 90° and a cumulative frequency of 100 times, and a refractive index of water (1.333) is input to the analyzing system as a refractive index of the dispersing medium. The concentration of the water dispersion or the water-based ink to be measured is usually $5 \times 10^{-3}\%$ by weight.

The content (solid content) of the water-insoluble vinyl polymer particles containing the colorant which are dispersed in the water dispersion and the water-based ink is preferably controlled to from 0.5 to 30% by weight and more preferably from 1 to 15% by weight in view of a good print density and a good ejection stability thereof.

The content of water in the water dispersion and the water-based ink of the present invention is preferably from 30 to 90% by weight and more preferably from 40 to 80% by weight.

The surface tension of the water dispersion of the present invention is preferably from 30 to 65 mN/m and more preferably from 35 to 60 mN/m as measured at 20° C., and the surface tension of the water-based ink of the present invention is preferably from 25 to 50 mN/m and more preferably from 27 to 45 mN/m as measured at 20° C.

The viscosity of a 10 wt % solution of the water dispersion is preferably from 2 to 6 mPa·s and more preferably from 2 to 5 mPa·s as measured at 20° C. to produce a water-based ink having a suitable viscosity. The viscosity of the water-based ink is preferably from 2 to 12 mPa·s and more preferably from 2.5 to 10 mPa·s in view of maintaining a good ejection property thereof.

EXAMPLES

In the following production examples, examples and comparative examples, the "part(s)" indicates "part(s) by weight" unless otherwise specified.

Production Examples 1 to 9

Ten percent by weight of the respective components including the monomers shown in Table 1, methyl ethyl ketone as an organic solvent, 2-mercaptoethanol as a chain transfer agent and V-65 as a polymerization initiator were charged into a reaction vessel, and then the reaction vessel was fully purged with a nitrogen gas to obtain a mixed solution.

Separately, remaining 90% by weight of the respective components were charged into a dropping funnel, and then an inside of the dropping funnel was fully purged with a nitrogen gas to thereby obtain a mixed solution. The mixed solution in the reaction vessel was heated to 75° C. under stirring in a nitrogen atmosphere, and then while stirring the mixed solution in the reaction vessel at 75° C., the mixed solution in the dropping funnel was gradually dropped thereinto for 3 h to conduct a polymerization thereof. After the elapse of about 2 h from completion of the dropping at 75° C., a solution prepared by dissolving 0.9 part of 2,2'-azobis(2,4-dimethylvaleronitrile) in 40 parts of methyl ethyl ketone based on 100 parts of the monomer component was added to the reaction solution, and the resultant solution was aged at 80° C. for 1 h to fully expel unreacted monomers out of the system, thereby obtaining polymer solutions A to G. The weight average molecular weights of the obtained polymers are shown in Table 1.

Meanwhile, the weight-average molecular weight (Mw) of the thus obtained polymers was measured by the above-mentioned method. Details of the compounds shown in Table 1 are as follows.

Compound Represented by the Above General Formula (1)

(1) Benzyl methacrylate: reagent available from Wako Junyaku Kogyo Co., Ltd.

Compound Represented by the Above General Formula (2)

(2) Polypropylene glycol monomethacrylate: tradename "BLEMMER PP-500" available from NOF Corporation; molar number of addition of propyleneoxide: 9 mol in average; terminal end: hydroxyl group (2) Polyethylene glycol/polypropylene glycol monomethacrylate: tradename "BLEMMER 50POEP-800B" available from NOF Corporation; molar number of addition of ethyleneoxide: 8 mol in average; molar number of addition of propyleneoxide: 6 mol in average; terminal end: 2-ethylhexyl group; block-added product (polyethylene glycol and polypropylene glycol were successively added from the side of methacrylic group)

(2) Poly(propylene glycolabutylene glycol) monomethacrylate: tradename "BLEMMER 50PPT-800" available from NOF Corporation; molar number of addition of propyleneoxide: 7 mol in average; molar number of addition of butyleneoxide: 6 mol in average; terminal end: hydroxyl group; random-added product Compounds Other than Those Represented by the General Formulae (1) and (2)

Polyethylene glycol monomethacrylate: molar number of addition of ethyleneoxide: 9 mol in average; terminal end: methoxy group (a) Methacrylic acid: reagent available from Wako Junyaku Kogyo Co., Ltd.

(b) Styrene macromer: tradename "AS-6(S)" available from Toagosei Co., Ltd.; number-average molecular weight: 6,000; polymerizable functional group: methacryloyloxy group (c) Styrene: reagent available from Wako Junyaku Kogyo Co., Ltd.

(c) 2-Ethylhexyl methacrylate: reagent available from Wako Junyaku Kogyo Co., Ltd.

V-65: polymerization initiator available from Wako Junyaku Kogyo Co., Ltd.; 2,2'-azobis(2,4-dimethylvaleronitrile)

TABLE 1

| | Production Examples | | | | | | | | |
|---|---|---|---|---|---|---|---|---|---|
| | 1 | 2 | 3 | 4 | 5 | 6 | 7 | 8 | 9 |
| Polymer solution | A | B | C | D | E | F | G | H | I |
| Composition of monomers | | | | | | | | | |
| (1) Benzyl methacrylate | 51 | 51 | 38 | 52 | 65 | | | 66 | 38 |
| (2) Polypropylene glycol monomethacrylate | 40 | 25 | 15 | | | | 25 | | 15 |
| (2) Polyethylene glycol/polypropylene glycol monomethacrylate | | | | 25 | | | | | 15 |
| (2) Poly(propylene glycol/butylene glycol) monomethacrylate | | | | | 15 | | | | |
| Polyethylene glycol monomethacrylate | | | 10 | | 10 | | | 25 | |
| (a) Methacrylic acid | 9 | 9 | 12 | 8 | 10 | 36 | 10 | 9 | 12 |
| (b) Styrene macromer | | 15 | 15 | 15 | 15 | | | | 10 |
| (c) Styrene | | | 10 | | | 22 | 65 | | 10 |
| (c) 2-Ethylhexy methacrylate | | | | | | 42 | | | |
| Methyl ethyl ketone (part) | 45 | 45 | 45 | 45 | 45 | 45 | 45 | 45 | 45 |
| 2-Mercaptoethanol (part) | 0.6 | 0.4 | 0.23 | 1.3 | 0.5 | 0.5 | 0.4 | 0.4 | 0.25 |
| V-65 (part) | 1.0 | 1.0 | 1.0 | 1.0 | 1.0 | 1.0 | 1.0 | 1.0 | 1.0 |
| Mw of polymer (×1,000) | 195 | 122 | 356 | 35 | 60 | 8 | 50 | 40 | 170 |

Example 1

Ninety parts of methyl ethyl ketone and a necessary amount of a neutralizing agent (a 5N sodium hydroxide aqueous solution) are added to 77 parts of a 50% solution of the polymer solution A in methyl ethyl ketone to neutralize methacrylic acid (neutralization degree: 70%), and then 370 parts of ion-exchanged water and further 90 parts of a monoazo-based yellow pigment (C.I. Pigment Yellow 74 available from Dai-Nichiseika Kogyo Co., Ltd.) were added thereto. The obtained mixture was mixed using a Disper and then passed through a dispersing apparatus "MICRO FLUIDIZER M-140K" under a pressure of 150 MPa 20 times.

The resultant kneading material was mixed with 100 parts of ion-exchanged water under stirring, and then methyl ethyl ketone was removed from the resultant mixture under reduced pressure at 60° C., followed by removing a part of water therefrom. Then, the obtained mixture was filtered through a 5 μm-mesh filter (acetyl cellulose membrane; outer diameter: 2.5 cm; available from Fuji Photo Film Co., Ltd.) fitted to a 25 mL syringe without a needle available from Terumo Co., Ltd., to remove coarse particles therefrom, thereby obtaining a water dispersion (solid content: 25% by weight).

The thus obtained water dispersion was mixed with the respective components shown in Table 2 to obtain a water-based ink.

Meanwhile, details of the compounds shown in Table 2 are as follows.

"SURFYNOL 465": nonionic surfactant available from Nissin Chemical Industry Co., Ltd.

"Ploxel XL2(S)": anti-fungus agent available from Avecia KK.

Examples 2 to 6 and Comparative Examples 1 to 3

The same procedure as in EXAMPLE 1 was repeated except for using the polymer solutions B to I respectively, thereby producing a water-based ink.

In any of the water dispersions obtained in the above Examples and Comparative Examples, the average particle size of particles contained therein fell within the range of from 0.05 to 0.2 μm.

The properties of the water-based inks obtained in Examples 1 to 6 and Comparative Examples 1 to 3 were evaluated by the following methods. The results are shown in Table 2.

(1) Gloss

Solid image printing was carried out on a coated paper (photographic paper (glossy) "KA450PSK (tradename)" available from Seiko Epson Corp.; mode: neat) using an ink-jet printer "Model EM930C" (piezoelectric type) available from Seiko Epson Corp. After allowing the printed paper to stand at 25° C. for one day, the gloss thereof was measured at 25° C. using a glossmeter (product number: PG-1M; measuring angle: 60°) available from Nippon Denshoku Industries Co., Ltd. The gloss (at a measuring angle of 60°) of a yellow ink using a yellow pigment printed on the coated paper is preferably 85 or more and more preferably 90 or more.

(2) Print Density

Solid image printing was carried out on an ordinary paper (double-sided high-quality ordinary paper "KA4250NT (tradename)" available from Seiko Epson Corp.) using the same ink-jet printer as used above (1). After allowing the printed paper to stand at 25° C. for 24 h, the print density thereof was measured at 25° C. using a Macbeth densitometer "RD914" (product number) available from Gretag-Macbeth AG. The print density of a yellow ink using a yellow pigment printed on the ordinary paper is preferably 1.10 or more and more preferably 1.20 or more.

(3) Dispersion Stability

The ink to be measured was placed in a closed container and preserved in a constant temperature oven maintained at 60° C. for one month. Thereafter, the average particle size of polymer particles in the ink (hereinafter referred to as "average particle size after storage") was measured using the laser particle analyzing system "ELS-8000" described above. The degree of dispersion stability as an index of dispersion stability of the ink was calculated from the following formula:

Degree of dispersion stability (%)={[average particle size after storage]/[average particle size before storage]}×100, and evaluated according to the following ratings:

[Evaluation Criteria]

⊚: not less than 95% but less than 105%

○: not less than 90% but less than 95%, or not less than 105% but less than 110%

○~Δ: not less than 80% but less than 90%, or not less than 110% but less than 120%

Δ: not less than 70% but less than 80%, or not less than 120% but less than 130% x: less than 70%, or not less than 130%

The dispersion stability is preferably in the range of from Rating ○ to Rating Δ.

TABLE 2

| | Examples | | | | | | Comparative Examples | | |
|---|---|---|---|---|---|---|---|---|---|
| | 1 | 2 | 3 | 4 | 5 | 6 | 1 | 2 | 3 |
| Polymer solution | A | B | C | D | E | I | F | G | H |
| Composition of ink | | | | | | | | | |
| Water dispersion (25%) | 30.0 | 30.0 | 30.0 | 30.0 | 30.0 | 30.0 | 30.0 | 30.0 | 30.0 |
| Glycerol | 10.0 | 10.0 | 10.0 | 10.0 | 10.0 | 10.0 | 10.0 | 10.0 | 10.0 |
| Triethylene glycol monobutyl ether | 7.0 | 7.0 | 7.0 | 7.0 | 7.0 | 7.0 | 7.0 | 7.0 | 7.0 |
| SURFYNOL 465 | 1.0 | 1.0 | 1.0 | 1.0 | 1.0 | 1.0 | 1.0 | 1.0 | 1.0 |
| Ploxel XL2(S) | 0.09 | 0.09 | 0.09 | 0.09 | 0.09 | 0.09 | 0.09 | 0.09 | 0.09 |
| Ion-exchanged water | 51.91 | 51.91 | 51.91 | 51.91 | 51.91 | 51.91 | 51.91 | 51.91 | 51.91 |
| Gloss | 107 | 93 | 96 | 101 | 90 | 104 | 65 | 73 | 99 |
| Print density | 1.15 | 1.20 | 1.10 | 1.21 | 1.20 | 1.30 | 0.98 | 1.15 | 0.98 |
| Dispersion stability | ○~Δ | ○ | ⊚ | ○ | ○ | ⊚ | X | ○~Δ | Δ |

From the results shown in Table 2, it was confirmed that the water-based inks obtained in Examples 1 to 6 all produced prints exhibiting a high gloss upon printing on the coated paper as well as a high print density upon printing on the ordinary paper, as compared to those obtained in Comparative Examples 1 to 3. Further, the prints obtained in Examples 1 to 6 by printing solid images on the commercially available coated paper and drying the printed images at 25° C. for 24 h, were strongly rubbed on its printed surface with fingers, but the solid images were free from rubbing-off or break. Therefore, it was confirmed that the water-based inks obtained in Examples were excellent in rubbing resistance.

Thus, the water-based ink containing the water dispersion for ink-jet printing according to the present invention is an excellent water-based ink which exhibits a high print density upon printing on an ordinary paper as well as a high gloss and a good rubbing resistance upon printing on a coated paper.

The water-based ink of the present invention is suitably applicable to a piezoelectric type ink-jet printing, though not particularly limited thereto.

What is claimed is:

1. A water dispersion for ink-jet printing, comprising colorant-containing water-insoluble vinyl polymer particles in which the water-insoluble vinyl polymer is a polymer containing constitutional units represented by the following formulae (1) and (2):

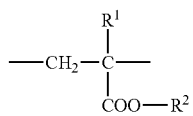
(1)

wherein $R^1$ is a hydrogen atom or a methyl group; and $R^2$ is a substituted or unsubstituted arylalkyl group having 7 to 22 carbon atoms or a substituted or unsubstituted aryl group having 6 to 22 carbon atoms; and

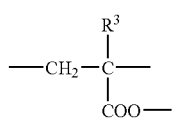
(2)

wherein $R^3$ is a hydrogen atom or a methyl group; $R^4O$ is an oxypropylene group; $R^5O$ is an oxyalkylene group having 2 or 4 carbon atoms; $R^6$ is a hydrogen atom, an alkyl group having 1 to 20 carbon atoms or a phenyl group which may be substituted with an alkyl group having 1 to 9 carbon atoms in which $R^4O$ and $R^5O$ are random-added or block-added, and when block-added, the structure may be in the form of either —COO—$(R^4O)_x$—$(R^5O)_y$—$R^6$ or —COO—$(R^5O)_y$—$(R^4O)_x$—$R^6$; and x and y represent average molar numbers of addition where x is a number from 1 to 30 and y is a number from 0 to 30, and if y is 2 or more, a plurality of the $R^5O$ groups may be the same or different a weight ratio of the constitutional unit represented by the formula (1) to the constitutional unit represented by the formula (2) in the polymer is in the range of from 1/1 to 5/1.

2. The water dispersion for ink-jet printing according to claim 1, wherein the constitutional unit represented by the formula (1) is a constitutional unit derived from benzyl(meth) acrylate.

3. The water dispersion for ink-jet printing according to claim 1 or 2, wherein the constitutional unit represented by formula (2) is a constitutional unit represented by the following formula (3) or (4):

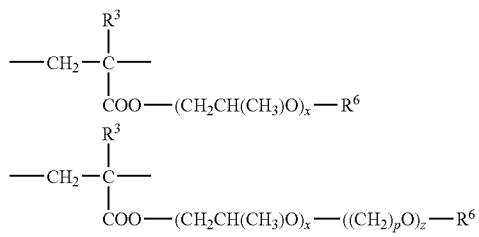

wherein p is a number of 2 or 4; z represents an average molar number of addition, and is a number from 1 to 30; and $(CH_2CH(CH_3)O)$ and $((CH_2)_pO)$ are random-added or block-added, and when being block-added, the structure may be in the form of either $—COO—(CH_2CH(CH_3)O)_x—((CH_2)_pO)_z—R^6$ or $—COO—((CH_2)_pO)_z—(CH_2CH(CH_3)O)_x—R^6$.

4. The water dispersion for ink-jet printing according to claim 1, wherein the water-insoluble vinyl polymer further contains a constitutional unit derived from a salt-forming group-containing monomer (a).

5. The water dispersion for ink-jet printing according to claim 4, wherein a weight ratio of the constitutional unit represented by the formula (2) to the constitutional unit derived from the salt-forming group-containing monomer (a) in the water-insoluble vinyl polymer is in the range of from 10/1 to 1/1.

6. The water dispersion for ink-jet printing according to claim 4, wherein the water-insoluble vinyl polymer contains 20 to 80% by weight of the constitutional unit represented by the formula (1), 5 to 60% by weight of the constitutional unit represented by the formula (2) and 3 to 30% by weight of the constitutional unit derived from the salt-forming group-containing monomer (a).

7. The water dispersion for ink-jet printing according to claim 1, wherein the water-insoluble vinyl polymer further contains constitutional units derived from a styrene-based macromer (b) and/or a hydrophobic monomer (c).

8. The water dispersion for ink-jet printing according to claim 1, wherein the water-insoluble vinyl polymer has a weight-average molecular weight of 5,000 to 500,000.

9. A water-based ink for ink-jet printing, comprising the water dispersion as defined in claim 1.

10. The water dispersion of claim 1, wherein the water-insoluble vinyl polymer contains reacted units of benzylmethacrylate and a polypropylene glycol monomethacrylate.

11. The water dispersion according to claim 1, wherein the water-insoluble vinyl polymer particle comprises reacted units of benzylmethacrylate and at least one selected from the group consisting of polypropylene glycol monomethacrylate, polyethylene glycol/polypropylene glycol monomethacrylate, and poly(propylene glycol/butylene glycol) monomethacrylate.

12. The water dispersion of claim 1, wherein the water-insoluble vinyl polymer comprises reacted units of methacrylic acid.

13. The water dispersion according to claim 1, further comprising glycerol.

14. The water dispersion according to claim 1, wherein the water-insoluble vinyl polymer comprises reacted units of benzylmethacrylate, a polypropylene glycol monomethacrylate, a styrene macromer and methacrylic acid.

15. The water dispersion according to claim 1, wherein the water-insoluble vinyl polymer comprises reacted units of benzylmethacrylate; at least one selected from the group consisting of polypropylene glycol monomethacrylate, polyethylene glycol/polypropylene glycol monomethacrylate and poly(propylene glycol/butylene glycol)monomethacrylate; styrene; and a styrene macromer.

* * * * *